July 22, 1958 L. D. STATHAM 2,844,034
MULTIRANGE PRESSURE TRANSDUCER

Filed Aug. 29, 1955 2 Sheets-Sheet 1

LOUIS D. STATHAM
INVENTOR

BY Philip Subkow
ATTORNEY.

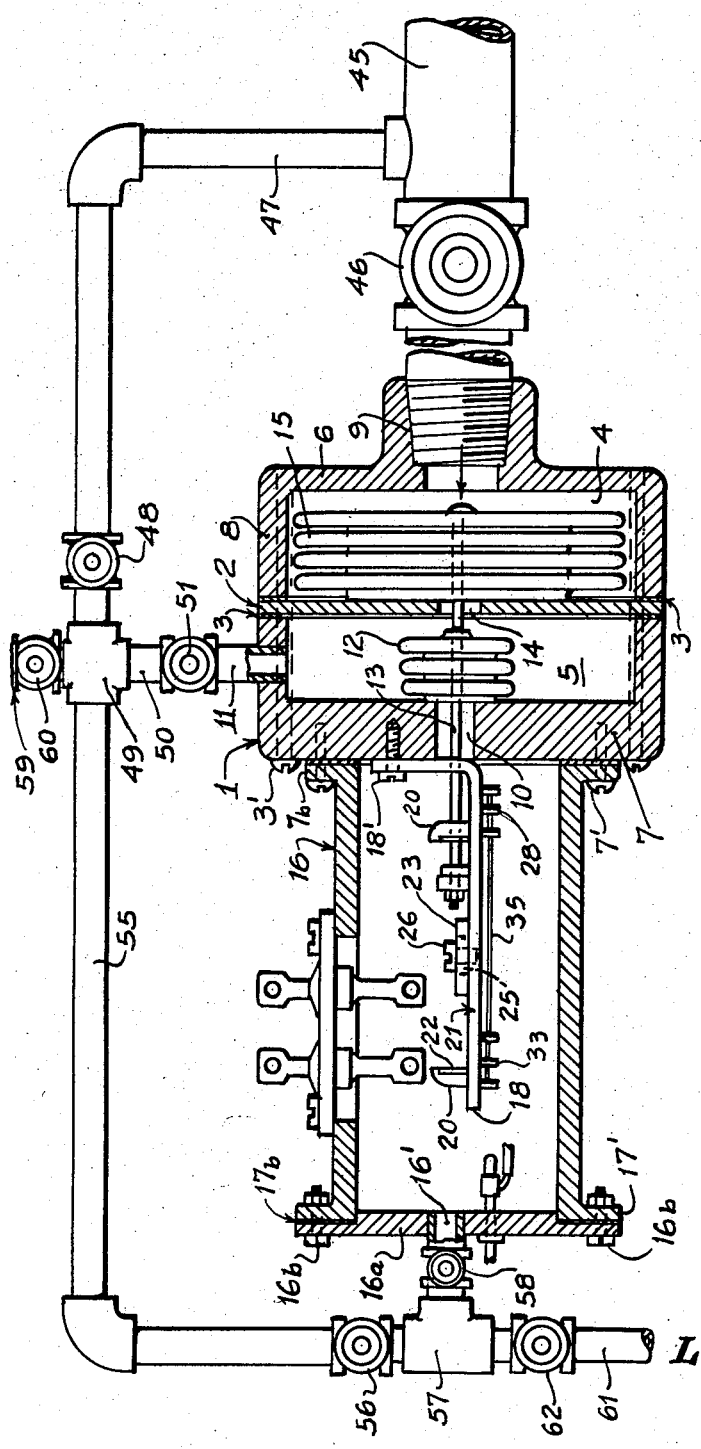

2,844,034

MULTIRANGE PRESSURE TRANSDUCER

Louis D. Statham, Beverly Hills, Calif., assignor to Statham Instruments, Inc., a corporation of California Application August 29, 1955, Serial No. 531,192

18 Claims. (Cl. 73—398)

This invention relates to a pressure responsive device, and particularly to a pressure transducer employing a motion responsive device such as an electrical resistance strain gauge. The invention is especially concerned with a pressure transducer which is designed to sense and measure pressures within widely differing pressure ranges, and which can also be employed as a differential pressure gauge.

This application is a continuation-in-part of my copending applications Serial No. 78,746, filed February 28, 1949, now Patent No. 2,720,113 and Serial No. 354,195, filed May 11, 1953.

In many applications, fluid pressures and pressure variations to be sensed, measured and recorded, vary considerably in range and magnitude. Accordingly, it is often required under these circumstances to use a different pressure gauge, and to use more than one gauge when the pressure to be measured is widely different, or when variation in pressure changes in range to values to which the pressure gauge being employed is insensitive.

The instant invention has as its major object the design of a pressure responsive device which is responsive to pressures of different ranges.

Another object is the provision of a pressure gauge embodying in a single instrument means for sensing and measuring pressures and changes in pressure in widely varying ranges.

Yet another object is the design of an instrument which will measure differential pressures at widely different pressure differences.

Still another object is the provision of an instrument having the previously mentioned characteristics and employing an electrical resistance strain gauge.

These and other objects and advantages will be apparent from the following description of my invention.

In general my device comprises two fluid pressure sensitive mechanisms, and in my preferred embodiment I employ a pair of fluid pressure transmitting means in the form of pistons or diaphragms, preferably the latter, said diaphragms being conveniently in the form of bellows. In a preferred embodiment the two bellows are arranged in a housing having a partition therein separating said bellows and forming two chambers each containing one of said bellows. The bellows in the first chamber is mounted on said partition, and said partition has a port therein permitting communication between the interior of said bellows and the interior of the second chamber.

A first inlet permits introduction of pressure fluid into the first chamber in contact with the outside of the bellows located therein, and a second inlet permits introduction of pressure fluid into the second chamber in contact with the outside of the other bellows in said second chamber. The port located in said partition permits passage of pressure fluid from the second chamber into the interior of the first bellows. Hence, the first bellows can be subjected to one pressure on the outside thereof and to another pressure interiorly.

Another housing is connected to the first housing adjacent the wall thereof on which is mounted the second bellows, said second housing forming a third chamber. A port in said wall permits fluid communication from the third chamber to the interior of the second bellows, and the third chamber has an inlet to permit introduction therein of a pressure fluid. Hence, it will be seen that one pressure can be transmitted by a pressure fluid to the outside of the second bellows by the liquid in the second chamber of the first housing, and another pressure can be transmitted to the inside of said second bellows via said third chamber.

The two bellows are connected by a centrally disposed member which passes through the port in the partition in the first housing, and the second bellows is connected via a central connecting link passing through the port in the wall of the first housing, to a transducer positioned in the second housing, to thereby sense or measure the displacement of said link brought about by the resultant pressure of the various pressure fluids against the two bellows. I have found that a wire strain gauge is particularly suited as the transducer element. Such wire strain gauges are described in my Patents Nos. 2,453,549 and 2,453,551. I also employ electrical circuits, measuring and recording means whereby the output of the bridge of which the gauge forms a part will measure the variation in the strain in the wires of the strain gauge resulting from the different pressures transmitted to the gauge by the bellows.

It is accordingly seen that I provide a pair of diaphragms or bellows, each of which can be subjected to varying pressures on the opposite sides thereof. Since the two bellows are connected together, and one of the bellows is in turn connected by a link or rod to the transducer, a pressure exerted against one side, the other side, or both sides of one or both of the bellows, and the resulting displacement of these bellows can be transmitted to the transducer as a function of the same or differences of the pressures applied to the bellows.

Maximum range of the instrument of the invention is determined by the maximum force which produces the maximum displacement of the rod connecting the diaphragm or diaphragms with the transducer, and the amount of such rod displacement or deflection of the diaphragms for a given force depends on the stiffness characteristics of the diaphragms. Since each of the two diaphragms or bellows of the invention device can be subjected to different pressures on opposite sides thereof, i. e. the fluid pressures in each of the three pressure chambers can be designated as $P_1$, $P_2$ and $P_3$ respectively, maximum displacement of the rod can be represented by the formula $D_{max} = (P_1 - P_2) a s_a + (P_2 - P_3) b s_b$, where $a$ is the area of the bellows separating the first and second chambers, $b$ is the area of the bellows separating the second and third chambers, and $s_a$ and $s_b$ are the respective stiffnesses of these bellows. Thus, it is seen from the above equation that knowing the areas of the bellows and their respective stiffness characteristics, the pressure values or ratios can be determined which give maximum displacement, or, knowing the maximum pressures to be encountered, the areas of the respective bellows can be determined given the stiffness values of these members. Further, it is seen from the above that the various values of pressure to which my device is sensitive can be high, low or intermediate and still lie within the permissible range of the instrument.

For example, by making the area of one bellows greater or stiffer than the other, e. g. by using a large bellows and a small bellows, low pressures can be measured by introduction of pressure into that chamber which brings the pressure fluid into contact with the large bellows, and high pressures by introductions of pressure fluid into that chamber which places the pressure fluid in contact with the small bellows. Differential pressures can also be measured or sensed by introduction of the pressure fluids into different chambers of my device, for example, by introducing pressure fluid from one source into the first and second chambers noted above, and introducing pressure fluid from another source into the third chamber, in the manner more fully pointed out below. The foregoing illustrates the remarkable versatility of my device.

The invention will be more clearly understood from the following detailed description of a preferred embodiment taken in connection with the accompanying drawings wherein:

Fig. 3 is a vertical section similar to Fig. 1, including the piping system for transmission of pressure fluids to the fluid pressure inlets of my device.

Figure 1:
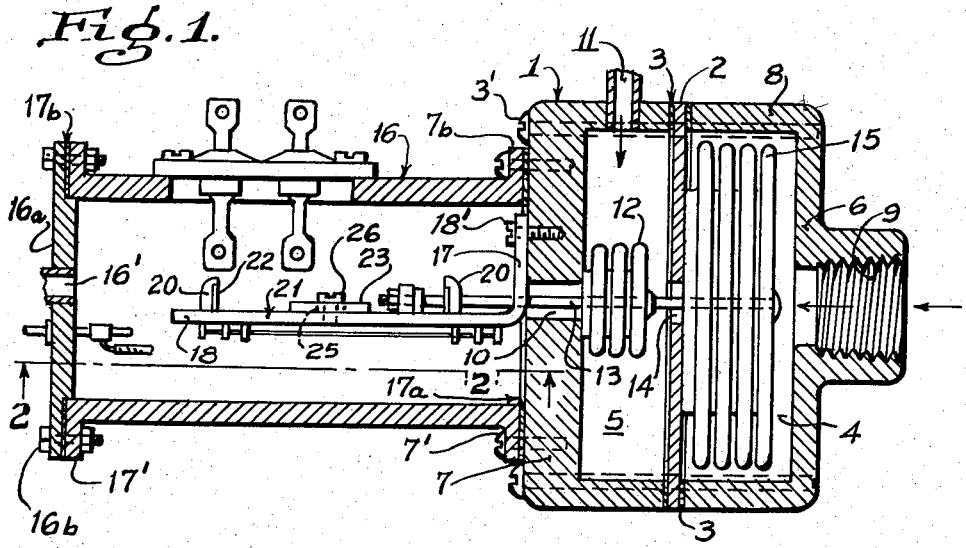
Fig. 1 is a vertical section of a portion of the pressure transmitter of my invention.
Figure 2:
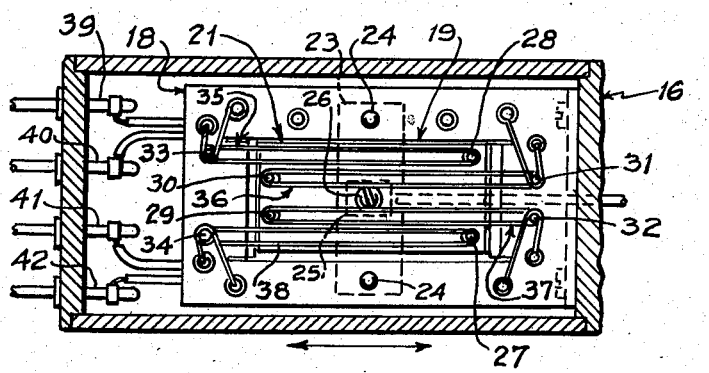
Fig. 2 is a partial fragmentary section taken on line 2—2 of Fig. 1.

The pressure transmitting device comprises a pair of adjacent pressure housings 1 and 16, the latter containing an electrical strain gauge. Housing 1 has a transverse partition 2, held by suitable screws 3' and by suitable fluid pressure-tight gaskets 3 to divide housing 1 into two chambers 4 and 5 having end walls 6 and 7 and a wall 8, housing 16 being connected to wall 7 by screws 7' passing through a flanged end 7b of housing 16. A pressure inlet 9 is provided in wall 6 and a bore 10 is provided in wall 7. A fluid pressure inlet 11 is provided in the wall 8 at chamber 5.

Mounted over the opening 10, and upon the wall 7 is a fluid-tight bellows 12 to which is connected a rod 13 which passes through the bore 10 and extends through a bore 14 in the partition 2, and is connected to the large bellows 15 mounted on the partition and over the bore 14 by a fluid-tight connection. It will be observed that the bellows 15 is larger than bellows 12 in the sense that the area of the bellows 15 subjected to pressure in chamber 4 is greater than the area of bellows 12 which is subjected to pressure in chamber 5. It will also be observed that the bellows 12 and 15 are each axially movable, i. e., movable in the direction of the axis of the diaphragm, to be truly responsive to fluid pressure imposed on them within the operative range of pressures here considered. Further, it is seen that the bellows 15 is subjected to the pressure in chamber 4 on one side (outside) thereof and to the pressure in chamber 5 transmitted through bore 12 to the interior of the bellows 15, so that the deflection of the bellows 15 is the result of the difference between the pressures in chambers 4 and 5.

The bore 10 communicates with housing or chamber 16 which has a fluid pressure inlet 16' in the end wall 16a thereof, said end wall being connected to another flanged end 17' of the chamber 16 by means of bolts 16b. A gasket 17a is positioned between end wall 7 and flanged end 7b of housing 16, and a gasket 17b is positioned between end wall 16a and the other flanged end 17' of housing 16. It is thus seen that bellows 12 is subjected to the pressure in chamber 5 on the outside of the bellows and to the pressure in chamber 16 transmitted through bore 10 to the interior of the bellows 12 so that deflection of the latter bellows is the result of the difference between the pressures in chambers 5 and 16.

A strain sensitive unbonded resistance wire gauge is mounted in chamber 16. I may employ, for example, the form of gauge shown in United States Letters Patent No. 2,453,549, or in No. 2,453,551. In both forms the motion of the armature to which the force to be measured is applied is limited by a stop in order to prevent overstraining of the wires. The gauge is thus not operative with forces greater than those sufficient to move the armature against such stop in the sense that forces in excess of such magnitude are not recorded. The form illustrated in the accompanying drawing is the form shown in Patent No. 2,453,551.

The bracket 17 is mounted by screws 18' on the wall 7 and is formed integrally with the frame 18 carrying a central rectangular hole 19 and upstanding plates 20. The armature 21 is suspended in the hole 19 by leaf springs 22 connected to plates 20.

A plate 23 is mounted on one side of the frame 18 by means of screws 24, across the opening 19, and carries a square hole 25. The armature 21 carries a stud 26 which passes through the hole 25, the hole and stud acting as a motion limit stop for the armature. The armature 21 carries electrically insulated pins 27 and 28 at one end thereof and electrically insulated pins 29 and 30 at the other end thereof. The frame 18 carries like pins 31 and 32 at one end and like pins 33 and 34 at the other end thereof. Electrical strain wires are wound in coils under tension, coil 35 being mounted on pins 28 and 33; coil 36 on pins 31 and 30; coil 37 on pins 29 and 32; and coil 38 on pins 34 and 27. These coils are connected by suitably insulated electrical connections to the insulated outlets 39, 40, 41 and 42. The unit is enclosed in chamber 16. These outlets can be connected to a conventional Wheatstone bridge, the four wire loops forming the four arms of the bridge.

The connection of the pressure gauge to the sources of fluid pressure is shown in Fig. 3. The pipe 45 is connected to a source of fluid pressure and is connected to inlet 9 through a valve 46, and a branch pipe 47 connects pipe 45 through a valve 48, a four-way connection 49, a branch pipe 50 and a valve 51, with the pressure inlet 11. Pipe 55 connects pipe 47, via connection 49, a valve 56, a T 57, and another valve 58, with the pressure inlet 16'. A fluid pressure line 59 connects a second source of fluid pressure through a valve 60 to the connection 49 for transmission to any of the pressure inlets 9, 11, or 16', via pipes 47, 50 or 55, and fluid pressure from a third source is transmitted through pipe 61 and valve 62 to the T 57 for distribution by proper manipulation of the valves to a desired inlet, e. g., 16'.

If it is desired to sense or measure pressures of relatively low range, valve 48 is closed and valve 46 is opened, and pipe 45 is connected to the low pressure source. Pressure fluid enters chamber 4 and the force thereof is exerted against bellows 15. Since bellows 15 is much greater in area than bellows 12, there will be a displacement of rod 13 to the left as viewed in Fig. 3, against the restraining action of bellows 12, moving armature 21 to cause a change in resistance of the strain wires and an output from the bridge. Instead of connecting the low pressure fluid source to pipe 45, such fluid can be conducted into chamber 4 by connecting said pressure source to line 59, closing valves 51 and 56, and opening valves 48 and 46. The low pressure source can alternatively be connected to chamber 4 by connecting pipe 61 to the fluid pressure source, closing valves 58, 51 and 60, and opening valves 62, 56, 48 and 46.

If it is desired to sense higher pressures, valves 48 and 56 are closed, valves 51 and 60 are opened, and line 59 is connected to the low pressure source. Pressure fluid enters chamber 5, and such pressure is exerted against the outside of bellows 12 and the inside of bellows 15, through passage of liquid through the bore 14. The forces thus exerted against the two bellows will tend to cause displacement of rod 13 in opposite directions, the response of bellows 15 tending to move rod 13 to the right as viewed in Fig. 3, and the response of bellows 12 tending toward displacement of rod 13 to the left. But since the inside area of bellows 15 is much greater than the outside surface area of bellows 12, bellows 15 will be subjected to a much greater force than bellows 12, resulting in a net displacement of rod 13 to the right as viewed in Fig. 3, and a change in resistance of the strain wires which is registered by a proportional output from the bridge circuit.

High pressures can also be sensed or measured in the above manner by connecting pipe 45 to the high pressure source, closing valves 46, 60 and 56, and opening valves 48 and 51, or by connecting pipe 61 to the high pressure source, closing valves 58, 48 and 60, and opening valves 62, 56 and 51. By either of the above procedures, the high pressure liquid wil be introduced into chamber 5 to bring about the displacement of rod 13 noted above.

Should it be desired to sense or measure pressures in an extra high range, line 61 can be connected to the pressure source and the pressure fluid introduced through inlet 16' into chamber 16, by closing valve 56 and opening valves 58 and 62. The fluid pressure in chamber 16 is transmitted via bore 10 to the interior of bellows 12, causing it to expand and to displace rod 13 to the right as viewed in Fig. 3, producing a change in resistance of the strain wires and a corresponding output from the bridge circuit. It will be observed that since the interior surface of bellows 12 is much smaller than the surface of bellows 15, a much larger pressure will be required to be exerted against bellows 12 for a given displacement of rod 13 than will be necessary to be exerted against bellows 15, assuming the stiffness characteristics of bellows 12 and 15 are essentially similar. Due to these factors and also because of the opposing restraint to expansion of bellows 12 presented by bellows 15 through its connection with bellows 12, extra high pressures can be measured by my device by introduction of the pressure fluid solely into chamber 16.

Instead of connecting the extra high pressure source to pipe 61, such high pressure source can be connected to line 59, with valves 48, 51 and 62 closed, and valves 60, 56 and 58 opened to permit introduction of the pressure fluid into chamber 16. Alternatively, this can be accomplished by connecting the high pressure source to pipe 45, with valves 46, 51, 60 and 62 closed, and valves 48, 56 and 58 opened.

The pressure fluid introduced into chamber 16 must of course be of a non-conducting type so as not to adversely affect operation of the strain gauge.

Also, for sensing pressures in an extra high range, this can be accomplished by introducing the high pressure fluid into both of chambers 4 and 5. In this case the displacement of rod 13 will be in the opposite direction from that taking place as result of the introduction of the high pressure fluid into chamber 16 alone. The reason for this is that the high pressure fluid is now exerted in chamber 5 against the outside of bellows 12 to contract same instead of against the inside of bellows 12 to expand same, as when the pressure fluid is in chamber 16. The forces transmitted by the fluids in chambers 4 and 5 against the large bellows 15 will be balanced since the same pressure will be exerted against both the exterior and interior surfaces of bellows 15. The high pressure fluid can be introduced into chambers 4 and 5 by connecting pipe 45 to the high pressure source, closing valves 60 and 56, and opening valves 46, 48 and 51, or for example, by connecting line 59 to the high pressure source, closing valve 56, and opening valves 60, 51, 48 and 46.

My instrument can also be employed as a differential pressure gauge by introducing fluid pressure from one source into both of chambers 4 and 5, and introducing pressure fluid from another source into chamber 16. Since the net force exerted against bellows 15 by the pressure fluids in chambers 4 and 5 will be zero, any displacement of rod 13 will be the result of the difference in force exerted against bellows 12 on the opposite sides thereof, or in other words by the difference in pressure between the fluid in chamber 5 and the fluid in chamber 16. To operate my device as a differential pressure gauge, one of the pressure sources can be connected to pipe 45, and the other pressure source to line 61, with valves 60 and 56 closed and valves 46, 48, 51, 58 and 62 opened. Alternatively, pipe 59 can be connected to the first pressure source instead of line 45. If the pressure in chamber 5 is greater than that in chamber 16 the displacement of rod 13 will be to the left, while the displacement of rod 13 will be in the opposite direction if the pressure in 16 exceeds that in chamber 5.

Instead of employing the relatively small bore 14 for fluid communication between chamber 5 and the interior of bellows 15, I may provide a much larger bore in partition 2 for this purpose.

Although a strain wire transducer is preferred in the instrument of my invention, I may replace the strain wire transducer with other forms of transducers such as an inductive type transducer, as will be understood by those skilled in the art.

From the foregoing, it is seen that I have provided a highly versatile force or pressure sensing device capable of sensing or measuring pressures varying from low range to extra high range, and also differential pressures. This is accomplished by providing a pair of diaphragms or bellows, preferably having unequal areas, in combination with an arrangement of pressure chambers and valves and conduit means to selectively introduce pressure fluids into one or more of said chambers so as to permit transmission of pressure selectively against one or both sides of one or both of the bellows, the two bellows being commonly linked to a motion sensing device or transducer to sense the net displacement of said bellows resulting from said pressures.

While I have described a particular embodiment of my invention for the purpose of illustration, it should be understood that various modifications and adaptations thereof may be made within the spirit of the invention as set forth in the appended claims.

I claim:

1. A pressure gauge, comprising a chamber, a diaphragm in said chamber, a port in the wall of said chamber positioned on one side of said diaphragm and adapted for connection to a source of fluid pressure, a second chamber, a second diaphragm in said second chamber, the area of said first diaphragm being substantially greater than the area of said second diaphragm, a port in said second chamber on one side of said second diaphragm and adapted for connection to the said source of fluid pressure, a fluid pressure connection in constantly open communication between said second chamber on the said one side of said second diaphragm and the other side of said first diaphragm, a port in said second chamber on the other side of said second diaphragm, a mechanical connection between said diaphragms, an electrical wire resistance strain gauge comprising a frame, an armature, strain wires connected to said frame and armature, a mechanical connection between said armature and said second diaphragm, a conduit connected to the first-named port and adapted for connection to said source of fluid pressure, a by-pass conduit connected to the first-named conduit and the port in said second chamber positioned on the said one side of said second diaphragm, a valve in said first conduit and a valve in said by-pass conduit.

2. A pressure gauge, comprising a first chamber, a diaphragm in said chamber, a first port in a wall of said chamber positioned on one side of said diaphragm, a second chamber, a second diaphragm in said second chamber, a second port in said second chamber on one side of said second diaphragm, a fluid pressure connection in constantly open communication between said second chamber and the other side of said first diaphragm, a third port in said second chamber on the other side of said second diaphragm, means for connecting each of said ports to a source of fluid pressure, and means connected to both of said diaphragms and movable in response to the deflection thereof.

3. A pressure gauge, comprising a first chamber, a diaphragm in said chamber, a first port in a wall of said chamber positioned on one side of said diaphragm, a second chamber, a second diaphragm in said second chamber, a second port in said second chamber on one side of said second diaphragm, a fluid pressure connection in constantly open communication between said second chamber and the other side of said first diaphragm, a third port in said second chamber on the other side of said second diaphragm, means for connecting each of said ports to a source of fluid pressure, a mechanical connection between said diaphragms, an electrical resistance strain wire gauge comprising a frame, an armature, strain wires connected to said frame and armature, and a mechanical connecttion between said armature and said second diaphragm.

4. A pressure gauge, comprising a first chamber, a diaphragm in said chamber, a first port in a wall of said chamber positioned on one side of said diaphragm, a second chamber, a second diaphragm in said second chamber, a second port in said second chamber on one side of said second diaphragm, a fluid pressure communication between said second chamber on said one side of said second diaphragm and the other side of said first diaphragm, a third port in said second chamber on the other side of said second diaphragm, a third chamber, said third port communicating with said third chamber, a fourth port in said third chamber, means for connecting each of said first, second and fourth ports to a source of fluid pressure, a mechanical connection between said diaphragms, an electrical resistance strain wire gauge comprising a frame, an armature, strain wires connected to said frame and armature, and a mechanical connection between said armature and said second diaphragm.

5. A pressure gauge, comprising a first chamber, a diaphragm in said chamber, a first port in a wall of said chamber positioned on one side of said diaphragm, a second chamber, a second diaphragm in said second chamber, a second port in said second chamber on one side of said second diaphragm, a fluid pressure communication between said second chamber on said one side of said second diaphragm and the other side of said first diaphragm, a third port in said second chamber on the other side of said second diaphragm, a third chamber, said third port communicating with said third chamber, a fourth port in said third chamber, means for connecting each of said first, second and fourth ports to a source of fluid pressure, means for selectively introducing pressure fluid into one or more of said chambers, and means connected to both of said diaphragms and responsive to the deflection of each of said diaphragms for indicating the deflection of said diaphragms.

6. A pressure gauge, comprising a first chamber, a diaphragm in said chamber, a first port in a wall of said chamber positioned on one side of said diaphragm, a second chamber, a second diaphragm in said second chamber, a second port in said second chamber on one side of said second diaphragm, a fluid pressure connection in constantly open communication between said second chamber and the other side of said first diaphragm, a third port in said second chamber on the other side of said second diaphragm, means for connecting each of said ports to a source of fluid pressure, a by-pass conduit connecting one of said ports with at least one of the other ports, a valve in said conduit, and means connected to both of said diaphragms and movable in response to the deflection thereof.

7. A pressure gauge, comprising a first chamber, a diaphragm in said chamber, a first port in a wall of said chamber positioned on one side of said diaphragm, a second chamber, a second diaphragm in said second chamber, a second port in said second chamber on one side of said second diaphragm, a fluid pressure communication between said second chamber on said one side of said second diaphragm and the other side of said first diaphragm, a third port in said second chamber on the other side of said second diaphragm, a third chamber, said third port communicating with said third chamber, a fourth port in said third chamber, means for connecting each of said first, second and fourth ports to a source of fluid pressure, a by-pass conduit connecting one of said first, second and fourth ports with at least one other of said three last mentioned ports, a valve in said conduit, a mechanical connection between said diaphragms, an electrical resistance strain wire gauge comprising a frame, an armature, strain wires connected to said frame and armature, and a mechanical connection between said armature and said second diaphragm.

8. A pressure gauge, comprising a first chamber, a diaphragm in said chamber, a first port in a wall of said chamber positioned on one side of said diaphragm, a second chamber, a second diaphragm in said second chamber, a second port in said second chamber on one side of said second diaphragm, a fluid pressure communication between said second chamber on said one side of said second diaphragm and the other side of said first diaphragm, a third port in said second chamber on the other side of said second diaphragm, a third chamber, said port communicating with said third chamber, a fourth port in said third chamber, a pipe connecting each of said first, second and fourth ports to a source of fluid pressure, a valve in each of said pipes, a by-pass conduit connecting one of said pipes with at least one other of said pipes, a mechanical connection between said diaphragms, an electrical resistance strain wire gauge comprising a frame, an armature, strain wires connected to said frame and armature, and a mechanical connection between said armature and said second diaphragm.

9. A pressure gauge, comprising a chamber, a partition in said chamber dividing said chamber into first and second pressure compartments, a first port in said partition, a bellows positioned in said first compartment and fixed to said partition over said port, a second port in said last named compartment, a third port, said third port being positioned in the wall of said second compartment, a second bellows in said second compartment positioned in the wall of said chamber over the third port, a fourth port, said fourth port being positioned in the wall of said second compartment, a third pressure compartment positioned adjacent said second compartment, said third port communicating with said third compartment, a fifth port in said third compartment, means for connecting each of said second, fourth and fifth ports to a source of fluid pressure, a rod connecting said bellows, and means connected to said second bellows to sense the displacement of said rod.

10. A pressure gauge as defined in claim 9, wherein one of said bellows has a greater area than the other bellows.

11. A pressure gauge, comprising a chamber, a partition in said chamber dividing said chamber into first and second pressure compartments, a first port in said partition, a bellows positioned in said first compartment and fixed to said partition over said port, a second port in said last named compartment, a third port, said third port being positioned in the wall of said second compartment, a second bellows in said second compartment positioned in the wall of said chamber over the third port, a fourth port, said fourth port being positioned in the wall of said second compartment, a third pressure compartment positioned adjacent said second compartment, said third port communicating with said third compartment, a fifth port in said third compartment, means for connecting each of said second, fourth and fifth ports to a source of fluid pressure, a by-pass conduit connecting one of said second, fourth and fifth ports with at least one of the other of said three last mentioned ports, a valve in said conduit, a rod connecting said bellows, said rod passing through said third port, and a strain wire gauge operatively connected to said rod and responsive to the movement thereof.

12. A pressure gauge, comprising a chamber, a partition in said chamber dividing said chamber into first and second pressure compartments, a first port in said partition, an axially movable diaphragm, said diaphragm being axially movable responsive to fluid pressure in said chamber and said diaphragm being positioned in said first compartment over said port, a second port in said first compartment, a third port, said third port being positioned in the wall of said second compartment, a second axially movable diaphragm, said second diaphragm being positioned in said second compartment in the wall of said chamber over the third port, a fourth port positioned in the wall of said second compartment, a third pressure compartment connected to said chamber and positioned adjacent said second compartment, said third port communicating with said third compartment, said second diaphragm being axially movable responsive to fluid pressure in said second and third compartments, a fifth port in said third compartment, means for connecting each of said second, fourth and fifth ports to a source of fluid pressure, means for selectively introducing pressure fluid into one or more of said compartments, and means connected to both of said diaphragms and responsive to the deflection of each of said diaphragms for indicating the deflection of said diaphragms.

13. A pressure gauge, comprising a chamber, a partition in said chamber dividing said chamber into first and second pressure compartments, a first port in said partition, a bellows positioned in said first compartment and fixed to said partition over said port, a second port in said last named compartment, a third port, said third port being positioned in the wall of said second compartment, a second bellows in said second compartment positioned in the wall of said chamber over the third port, a fourth port, said fourth port being positioned in the wall of said second compartment, a third pressure compartment positioned adjacent said second compartment, said third port communicating with said third compartment, a fifth port in said third compartment, means for connecting each of said second, fourth and fifth ports to a source of fluid pressure, a rod connecting said bellows, said rod passing through said third port, and a strain wire gauge operatively connected to said rod and responsive to the movement thereof.

14. A pressure gauge, comprising a chamber, a partition in said chamber dividing said chamber into first and second pressure compartments, a first port in said partition, an axially movable diaphragm, said diaphragm being axially movable responsive to fluid pressure in said chamber and said diaphragm being positioned in said first compartment over said port, a second port in said first compartment, a third port, said third port being positioned in the wall of said second compartment, a second axially movable diaphragm, said second diaphragm being positioned in said second compartment in the wall of said chamber over the third port, a fourth port positioned in the wall of said second compartment, a third pressure compartment connected to said chamber and positioned adjacent said second compartment, said third port communicating with said third compartment, said second diaphragm being axially movable responsive to fluid pressure in said second and third compartments, a fifth port in said third compartment, a by-pass conduit connecting one of said second, fourth and fifth ports with at least one of the other of said three last mentioned ports, a valve in said conduit, a rod connecting said diaphragms, said rod passing through said third port, and a strain wire gauge operatively connected to said rod and responsive to the movement thereof.

15. A pressure gauge, comprising a chamber, a partition in said chamber dividing said chamber into first and second pressure compartments, a first port in said partition, an axially movable diaphragm, said diaphragm being axially movable responsive to fluid pressure in said chamber and said diaphragm being positioned in said first compartment over said port, a second port in said first compartment, a third port, said third port being positioned in the wall of said second compartment, a second axially movable diaphragm, said second diaphragm being positioned in said second compartment in the wall of said chamber over the third port, a fourth port positioned in the wall of said second compartment, a third pressure compartment connected to said chamber and positioned adjacent said second compartment, said third port communicating with said third compartment, said second diaphragm being axially movable responsive to fluid pressure in said second and third compartments, a fifth port in said third compartment, a pipe connecting each of said second, fourth and fifth ports to a source of fluid pressure, a valve in each of said pipes, a by-pass conduit connecting one of said pipes with at least one other of said pipes, a rod connecting said diaphragms, said rod passing through said third port, and a strain wire gauge operatively connected to said rod and responsive to the movement thereof.

16. A pressure gauge comprising a pair of partitions forming three pressure chambers, a first port in said first partition between the first and second pressure chambers, a first bellows positioned in the first chamber and fixed to said first partition over said first port, a second port in said first chamber, a first conduit connected to said second port, a third port in said second partition between the second and third chambers, a second bellows in said second chamber positioned on said second partition over the third port, a fourth port, said fourth port being positioned in said second chamber, a fifth port positioned in a wall of said third chamber, a mechanical connection between said bellows, means connected to both of said bellows and responsive to the deflection of each of said bellows for indicating the deflection of said bellows, a second conduit connected to said fourth port, a third conduit connected to said fifth port, each of said first, second and third conduits being adapted for connection to a source of fluid pressure, a first by-pass conduit connected between said first and second conduits, a second by-pass conduit connected between said second and third conduits, a valve in each of said first, second and third conduits, a valve in said first by-pass conduit, and a valve in said second by-pass conduit.

17. A pressure gauge comprising a pair of partitions forming three pressure chambers, a first port in said first partition between the first and second pressure chambers, a first bellows positioned in the first chamber and fixed to said first partition over said first port, a second port in said first chamber, a first conduit connected to said second port, a third port in said second partition between the second and third chambers, a second bellows in said second chamber positioned on said second partition over the third port, a fourth port, said fourth port being positioned in said second chamber, a fifth port positioned in a wall of said third chamber, a rod connecting said bellows, a resistance strain wire gauge in said third chamber, said gauge comprising a frame, an armature, strain wires positioned on said armature and frame, and a rod passing through the port over which said second bellows is mounted and connecting said second bellows to said armature, a second conduit connected to said fourth port, a third conduit connected to said fifth port, each of said first, second and third conduits being adapted for connection to a source of fluid pressure, a first by-pass conduit connected between said first and second conduits, a second by-pass conduit connected between said second and third conduits, a valve in each of said first, second and third conduits, a valve in said first by-pass conduit, and a valve in said second by-pass conduit.

18. A pressure gauge as defined in claim 17, wherein the area of said first bellows is substantially greater than the area of said second bellows.

(References on following page)

References Cited in the file of this patent

UNITED STATES PATENTS

| | | |
|---|---|---|
| 1,172,087 | Westcott | Feb. 15, 1916 |
| 2,604,116 | Baily | July 22, 1952 |
| 2,635,581 | Karig | Apr. 21, 1953 |
| 2,664,749 | Jones | Jan. 5, 1954 |
| 2,699,069 | Baily | Jan. 11, 1955 |
| 2,728,231 | Blair | Dec. 27, 1955 |

FOREIGN PATENTS

| | | |
|---|---|---|
| 495,575 | Canada | Aug. 25, 1953 |